(12) United States Patent
Faizakof et al.

(10) Patent No.: US 11,645,460 B2
(45) Date of Patent: May 9, 2023

(54) PUNCTUATION AND CAPITALIZATION OF SPEECH RECOGNITION TRANSCRIPTS

(71) Applicant: GENESYS TELECOMMUNICATIONS LABORATORIES, INC., Daly City, CA (US)

(72) Inventors: Avraham Faizakof, Tel-Aviv (IL); Arnon Mazza, Tel-Aviv (IL); Lev Haikin, Tel-Aviv (IL); Eyal Orbach, Tel-Aviv (IL)

( * ) Notice: Subject to any disclaimer, the term of this patent is extended or adjusted under 35 U.S.C. 154(b) by 263 days.

(21) Appl. No.: 17/135,283

(22) Filed: Dec. 28, 2020

(65) Prior Publication Data

US 2022/0208176 A1 Jun. 30, 2022

(51) Int. Cl.
*G06F 40/232* (2020.01)
*G06N 20/00* (2019.01)
*G06F 40/279* (2020.01)
*G06F 40/169* (2020.01)
*G10L 15/04* (2013.01)
*G10L 15/06* (2013.01)
*G10L 15/197* (2013.01)
*G10L 15/22* (2006.01)

(52) U.S. Cl.
CPC .......... *G06F 40/232* (2020.01); *G06F 40/169* (2020.01); *G06F 40/279* (2020.01); *G06N 20/00* (2019.01); *G10L 15/04* (2013.01); *G10L 15/063* (2013.01); *G10L 15/197* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 10,388,272 B1 * | 8/2019 | Thomson | G10L 15/22 |
| 2002/0099744 A1 * | 7/2002 | Coden | G06F 40/232 |
| | | | 715/260 |
| 2015/0317069 A1 * | 11/2015 | Clements | G06F 3/04842 |
| | | | 715/773 |

(Continued)

OTHER PUBLICATIONS

PCT Search Report and Written Opinion of co-pending PCT application having application No. PCT/US/2021/065040 dated Apr. 13, 2022.

(Continued)

*Primary Examiner* — Douglas Godbold

(57) ABSTRACT

A first text corpus comprising punctuated and capitalized text is received. The words in the first text corpus are then annotated with a set of labels indicating a punctuation and a capitalization of each word. At an initial training stage, a machine learning model is trained on a first training set using the annotated words from the first text corpus and the labels. A second text corpus is received representing conversational speech. The words in the second text corpus are then annotated with the set of labels. In a re-training stage, the machine learning model is re-trained on a second training set comprising the annotated words from the second text corpus, and the labels. At an inference stage, the trained machine learning model is applied to a target set of words representing conversational speech to predict a punctuation and capitalization of each word in the target set.

26 Claims, 5 Drawing Sheets

(56) References Cited

U.S. PATENT DOCUMENTS

2019/0057306 A1* 2/2019 Xue .................. G06F 16/35
2020/0243094 A1* 7/2020 Thomson .......... H04M 3/42382
2021/0365632 A1* 11/2021 Trim ................. G06F 17/16

OTHER PUBLICATIONS

Sunkara Monica, et al., "Robust Prediction Of Punctuation and Truecasing for Medical ASR", in Proceedings of the First Workshop on Natural Language Processing for Medical Conversations, 2020, pp. 53-62, Proceedings of the 1st Workshop on NLP for Medical Conversations, Jul. 1, 2020, pp. 53-62, XP055908140. URL: https://aclanthology.org/2020.nlpmc-1.8.pdf.

Thai Binh Nguyen, et al., "Improving Vietnamese Named Entity Recognition from Speech Using Word Capitalization and Punctuation Recovery Models", Arxiv.org., Cornell University Library, 201 Olin Library Cornell University Ithaca, NY 14853, Oct. 1, 2020, XP081775561.

Pappagari Raghavendra et al., "Joint Prediction of Truecasing and Punctuation for Conversational Speech in Low-Resource Scenarios", 2021 IEEE Automatic Speech Recognition and Understanding Workshop (ASRU), IEEE, Dec. 13, 2021, pp. 1185-1191, XP034076973.

Pais Vasile et al., "Capitalization and Punctuation Restoration: A Survey", Artificial Intelligence Review, Springer Netherlands, NL, vol. 55, No. 3, Jul. 23, 2021, pp. 1681-1722, XP037730203.

* cited by examiner

PUNCTUATION AND CAPITALIZATION OF SPEECH RECOGNITION TRANSCRIPTS

BACKGROUND

In call center analytics, speech recognition is used to transcribe conversations between agents and customers, as a first step in the analysis of these conversions, for example, to detect important call events, client sentiment, or to summarize the content of the conversations. Another common use case for an automatic transcription of calls in a call center is to perform call quality control, e.g., by a supervisor.

Traditionally, speech recognition results do not contain punctuation and capitalization of the text. As a result, automatically-generated transcripts are less readable than human-generated transcripts, which are more often punctuated and capitalized.

In addition to being more readable, punctuation and capitalization are important if the recognized text is to be further processed by downstream natural language processing (NLP) applications. For example, named entity recognizers clearly benefit from the capitalization of names and locations that makes those entities easier to recognize.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive a first text corpus comprising punctuated and capitalized text, annotate words in said first text corpus with a set of labels, wherein said labels indicate a punctuation and a capitalization associated with each of said words in said first text corpus, at an initial training stage, train a machine learning model on a first training set comprising: (i) said annotated words in said first text corpus, and (ii) said labels, receive a second text corpus representing conversational speech, annotate words in said second text corpus with said set of labels, wherein said labels indicate a punctuation and a capitalization associated with each of said words in said second text corpus, at a re-training stage, re-train said machine learning model on a second training set comprising: (iii) said annotated words in said second text corpus, and (iv) said labels, and at an inference stage, apply said trained machine learning model to a target set of words representing conversational speech, to predict a punctuation and capitalization of each word in said target set.

There is also provided, in an embodiment, a method comprising: receiving a first text corpus comprising punctuated and capitalized text; annotate words in said first text corpus with a set of labels, wherein said labels indicate a punctuation and a capitalization associated with each of said words in said first text corpus; at an initial training stage, training a machine learning model on a first training set comprising: (i) said annotated words in said first text corpus, and (ii) said labels; receiving a second text corpus representing conversational speech; annotating words in said second text corpus with said set of labels, wherein said labels indicate a punctuation and a capitalization associated with each of said words in said second text corpus; at a re-training stage, re-training said machine learning model on a second training set comprising: (iii) said annotated words in said second text corpus, and (iv) said labels; and at an inference stage, applying said trained machine learning model to a target set of words representing conversational speech, to predict a punctuation and capitalization of each word in said target set.

There is further provided, in an embodiment, a computer program product comprising a non-transitory computer-readable storage medium having program instructions embodied therewith, the program instructions executable by at least one hardware processor to: receive a first text corpus comprising punctuated and capitalized text; annotate words in said first text corpus with a set of labels, wherein said labels indicate a punctuation and a capitalization associated with each of said words in said first text corpus; at an initial training stage, train a machine learning model on a first training set comprising: (i) said annotated words in said first text corpus, and (ii) said labels; receive a second text corpus representing conversational speech; annotate words in said second text corpus with said set of labels, wherein said labels indicate a punctuation and a capitalization associated with each of said words in said second text corpus; at a re-training stage, re-train said machine learning model on a second training set comprising: (iii) said annotated words in said second text corpus, and (iv) said labels; and at an inference stage, apply said trained machine learning model to a target set of words representing conversational speech, to predict a punctuation and capitalization of each word in said target set.

In some embodiments, the labels indicating punctuation are selected form the groups consisting of: comma, period, question mark, and other, and wherein said labels indicating capitalization are selected from the group consisting of: capitalized and other.

In some embodiments the first text corpus is preprocessed, before said training, by at least transforming all words in said first text corpus into lowercase.

In some embodiments the second text corpus is preprocessed, before said re-training, by performing contextualization, and wherein said contextualization comprises segmenting said text corpus into segments, each comprising at least two sentences.

In some embodiments the second text corpus is preprocessed, before said re-training, by performing data augmentation, and wherein said data augmentation comprises extending at least some of said segments by adding at least one of: one or more preceding sentences in said conversational speech, and one or more succeeding sentences in said conversational speech.

In some embodiments the predicting comprises a confidence score associated with each of said predicted punctuation and predicted capitalization, and wherein, when a word in said target set is included in two or more of said segments and receives two or more of said predictions with respect to said punctuation or capitalization, said confidence scores associated with said two or more predictions are averaged to produce a final confidence score of said predicting.

In some embodiments the second text corpus is preprocessed, before said re-training, by including end-of-sentence (EOS) embeddings.

In some embodiments the second text corpus and said target set of words each comprises transcribed text representing a conversation between at least two participants, and wherein said at least two participants are an agent at a call center and a customer.

In some embodiments the transcribing comprises at least one analysis selected from the group consisting of: textual detection, speech recognition, and speech-to-text detection.

There is further provided, in an embodiment, a system comprising at least one hardware processor; and a non-transitory computer-readable storage medium having stored thereon program instructions, the program instructions executable by the at least one hardware processor to perform operations of a multi-task neural network, the multi-task neural network comprising: a capitalization prediction network that receives as input a text corpus comprising at least one sentence, and predicts a capitalization of each word in said at least one sentence, wherein the capitalization prediction network is trained based on a first loss function, a punctuation prediction network that receives as input said text corpus, and predicts a punctuation with respect to said text corpus, wherein the punctuation prediction network is trained based on a second loss function, and an output layer which outputs a joint prediction of said capitalization and said punctuation, based on a multi-task loss function that combines said first and second loss functions, wherein said capitalization prediction network and said punctuation prediction network are jointly trained.

In some embodiments, the program instructions are further executable to apply, at an inference stage, said multi-task neural network to a target set of words representing conversational speech, to predict a punctuation and capitalization of each word in said target set.

In some embodiments the joint training comprises training said capitalization prediction network and said punctuation prediction network jointly, at an initial training stage, on a first training set comprising: (i) a first text corpus comprising punctuated and capitalized text; and (ii) labels indicating a punctuation and a capitalization associated with each of said words in said first text corpus.

In some embodiments the joint training further comprises training said capitalization prediction network and said punctuation prediction network jointly, at a re-training stage, on a second training set comprising: (i) a second text corpus representing conversational speech; and (ii) labels indicating a punctuation and a capitalization associated with each of said words in said second text corpus.

In some embodiments the labels indicating punctuation are selected form the groups consisting of: comma, period, question mark, and other, and wherein said labels indicating capitalization are selected from the group consisting of: capitalized and other.

In some embodiments the first text corpus is preprocessed, before said training, by at least transforming all words in said first text corpus into lowercase.

In some embodiments the second text corpus is preprocessed, before said re-training, by performing contextualization, and wherein said contextualization comprises segmenting said text corpus into segments, each comprising at least two sentences.

In some embodiments the second text corpus is preprocessed, before said re-training, by performing data augmentation, and wherein said data augmentation comprises extending at least some of said segments by adding at least one of: one or more preceding sentences in said conversational speech, and one or more succeeding sentences in said conversational speech.

In some embodiments the second text corpus is preprocessed, before said re-training, by including end-of-sentence (EOS) embeddings.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
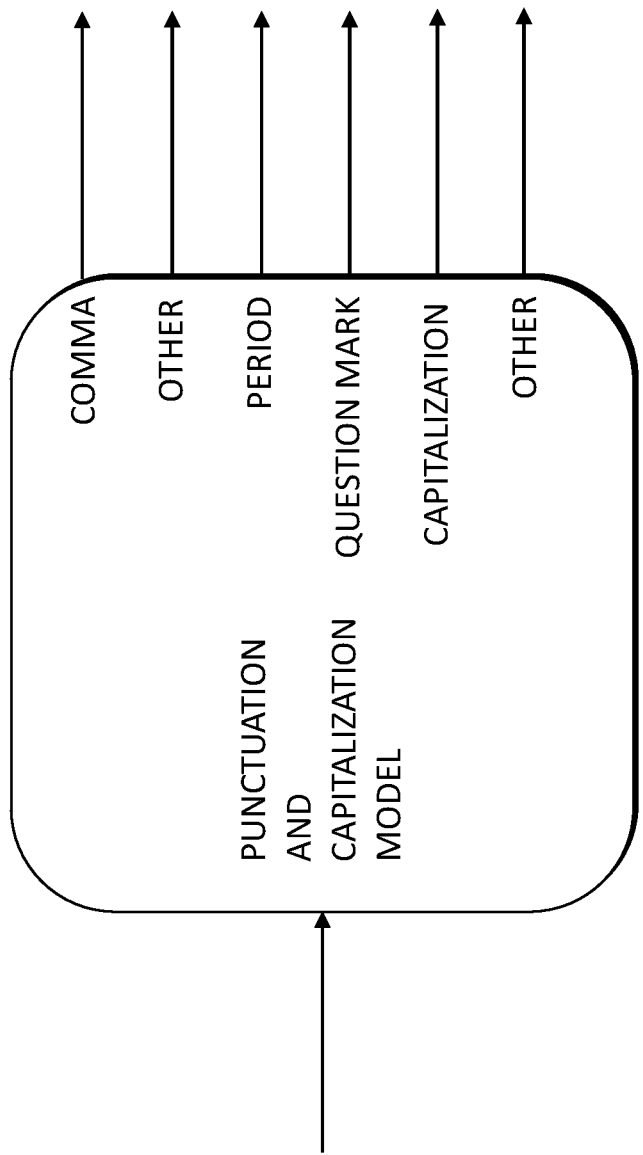
FIG. 1 schematically illustrates a model for predicting punctuation and capitalization jointly, according to some embodiments.

Disclosed herein are a method, system, and computer program product for automated prediction of punctuation and capitalization in transcribed text. In some embodiments, the present disclosure is particularly suitable for automated punctuation and capitalization of conversational speech transcriptions, particularly, e.g., in the context of automated transcription of contact center interactions.

Automatic Speech Recognition (ASR) systems are becoming widely adopted in various applications, such as voice commands, voice assistants, dictation tools, and as conversation transcribers. In many ASRs, a serious limitation is the lack of any punctuation or capitalization of the transcribed text. This can be problematic both in the case of visual presentation of the output, where the non-punctuated transcripts are more difficult to read and comprehend, and when these transcripts are used as inputs for downstream tasks such as those in the domain of Natural Language Processing (NLP). For example, common NLP systems are usually trained on punctuated text, thus a lack of punctuation can cause a significant deterioration in their performance.

Typically, the tasks of punctuation and capitalization are solved using supervised machine learning methods. Such models may use a transcribed and punctuated speech corpus to train a machine learning model for predicting text punctuation using a set of features, e.g., the text itself, speaker input indication, and/or timing input. Other approaches may rely on a sequence-to-sequence network architecture, where the input is a sequence of lowercase, unpunctuated words and the output is a sequence with corrected case and punctuation inserted.

In some embodiments, the present disclosure provides for adding punctuation and capitalization to automated transcripts, which may be particularly suitable for use in conjunction with transcripts of multi-turn call center conversations, e.g., representing back-and-forth dialogue between a customer and an agent.

In some embodiments, the present disclosure provides for a supervised machine learning model trained using a two-stage training process, in which (i) the first step uses a large amount of punctuated and capitalized text from a provided corpus, e.g., from a readily available and economical source such as internet text, and (ii) the second step uses a relatively smaller amount of dialog transcripts annotated for punctuation and capitalization, which, due to the manual annotation costs, is more costly to obtain. In some embodiments, the second training step employs a material augmentation mechanism, which provides contextual information with respect to the text in the training dataset. In some embodiments, material augmentation may also employ End of Sentence embeddings.

In some embodiments, the present machine learning model is based on a unique neural network architecture configured for multitask training. Multi-task learning or training is a category of machine learning tasks, in which multiple learning tasks are solved at the same time, while exploiting commonalities across tasks. This can result in improved learning efficiency and prediction accuracy for the task-specific models, when compared to training the models separately. A multitask machine learning model learns two or more tasks in parallel, while using a shared representation, wherein what is learned for each task can help other tasks be learned better. In the classification context, multi-task learning aims to improve the performance of multiple classification tasks by learning them jointly.

Accordingly, in some embodiments, the present disclosure provides for a machine learning model which uses a neural network architecture configured for learning jointly capitalization and punctuation, wherein the joint learning provides for potential information gain over separate capitalization and punctuation models. In some embodiments, such machine learning model exploits a strong interdependency between the two learning tasks. For example, a capitalized word often comes after a period, and punctuation information such as question marks and periods may indicate that a next word should be capitalized.

In some embodiments, the present disclosure provides for training a joint model using a training corpus comprising (i) punctuated and capitalized generic text, and (ii) in domain multi-turn dialog annotated for punctuation and capitalization. In some embodiments, the joint machine learning model performs multiple distinct machine learning tasks, the joint model comprising capitalization machine learning classifier that predicts a capitalization label for a target word or token, and a punctuation machine learning model that predicts a punctuation label.

As schematically illustrated in FIG. 1, in some embodiments, the present disclosure provides for a single machine learning model for predicting punctuation and capitalization jointly, wherein a loss function of the model optimally weighs each task. By using a single model, the present disclosure provides for a more consistent output and improved accuracy, e.g., when capitalization may be dependent on the results of a nearby punctuation prediction. In addition, combining both tasks into a single model may provide for reduced computational overhead and better model performance.

In some embodiments, the present disclosure employs sequence tagging, defined as a type of pattern recognition task that involves the automated assignment of a class label to each member of a sequence of observed values.

In the context of speech recognition, sequence tagging may include part-of-speech tagging (POS tagging), which is the process of marking up a word in a text as corresponding to a particular part of speech, based on both its definition and its context, e.g., the identification of words in a sentence as nouns, verbs, adjectives, adverbs, etc. Sequence tagging may also include other NLP tasks, such as chunking and named entity recognition (NER).

Most sequence labeling algorithms are probabilistic in nature, relying on statistical inference to find the best sequence. The most common statistical models in use for sequence labeling make a Markov assumption, i.e. that the choice of label for a particular word is directly dependent only on the immediately adjacent labels; hence the set of labels forms a Markov chain. This leads naturally to the hidden Markov model (HMM), one of the most common statistical models used for sequence labeling. Other common models in use are the maximum entropy Markov model and conditional random field.

In some embodiments, the present disclosure provides for one or more neural network-based machine learning models trained to perform a sequence tagging task. In some embodiments, these models may include one or more Long Short-Term Memory (LSTM) networks, bidirectional LSTM networks (BiLSTM), LSTM networks with a CRF layer (LSTM-CRF), and/or bidirectional LSTM networks with a Conditional Random Field (CRF) layer (BILSTM-CRF).

In some embodiments, a trained machine learning model of the present disclosure may be configured to receive a sequence of words as input, and to output, for every word in the sequence, a predicted punctuation tag from a set of punctuation tags, wherein the punctuation tag indicates a punctuation action to be carried out with respect to the word, e.g.:

| Tag | Punctuation Action |
| --- | --- |
| COMMA | Insert a comma after this word |
| OTHER | No punctuation after this word |
| PERIOD | Insert a period after this word |
| QUESTION MARK | Insert a question mark after this word |

In some embodiments, a trained machine learning model of the present disclosure may be configured to receive a sequence of words as input, and to output, for every word in the sequence, a predicted capitalization tag for this word from a closed set of capitalization tags, wherein the capitalization tag indicates a capitalization action to be carried out with respect to the word e.g.:

| Tag | Capitalization Action |
| --- | --- |
| C | Capitalize this word |
| OTHER | Do not capitalize this word |

Figure 2A:
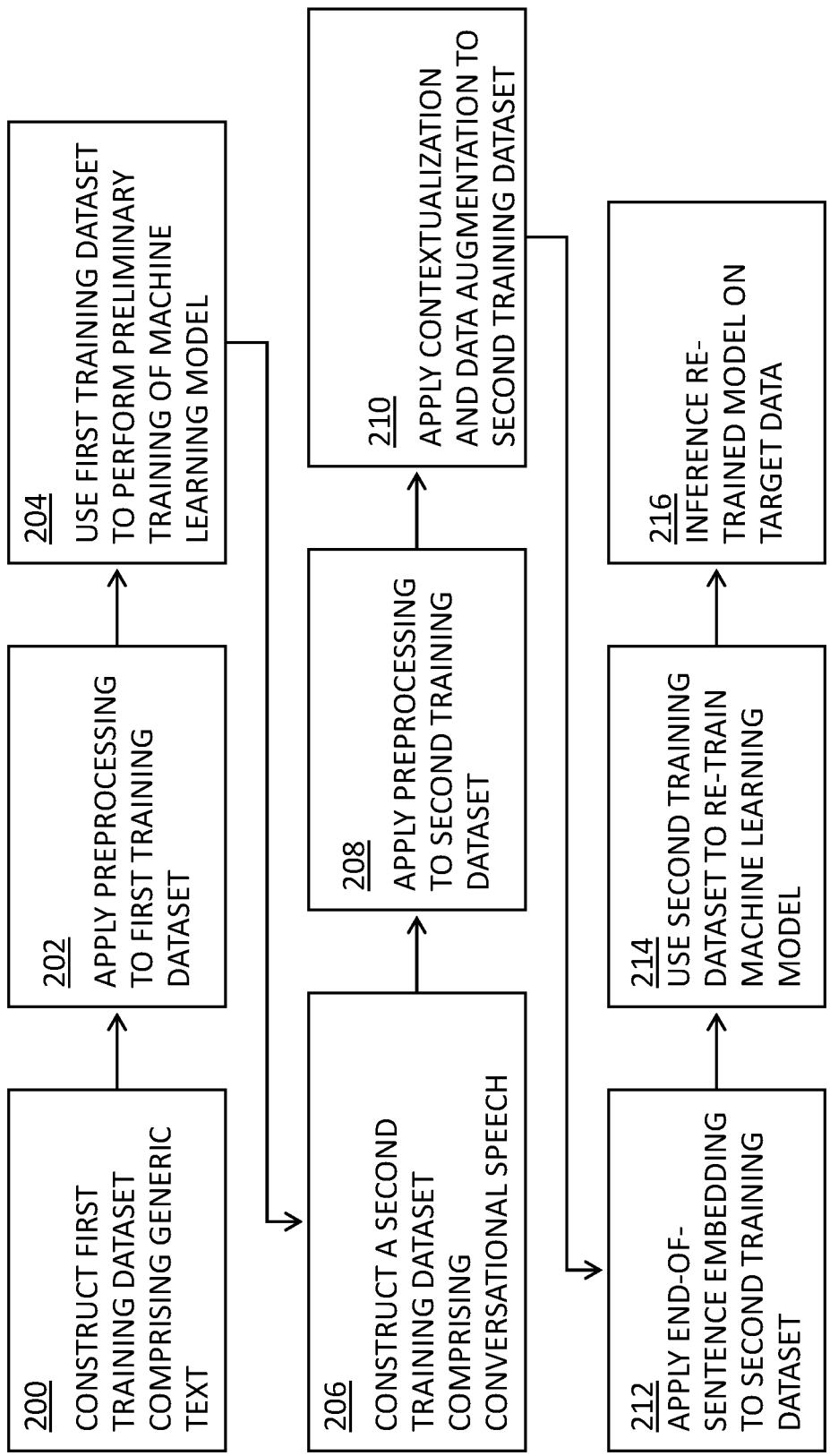
FIG. 2A is a flowchart of the functional steps is a process of the present disclosure for training for generating a machine learning model for automated prediction of punctuation and capitalization in transcribed text; according to some embodiments.
Figure 2B:
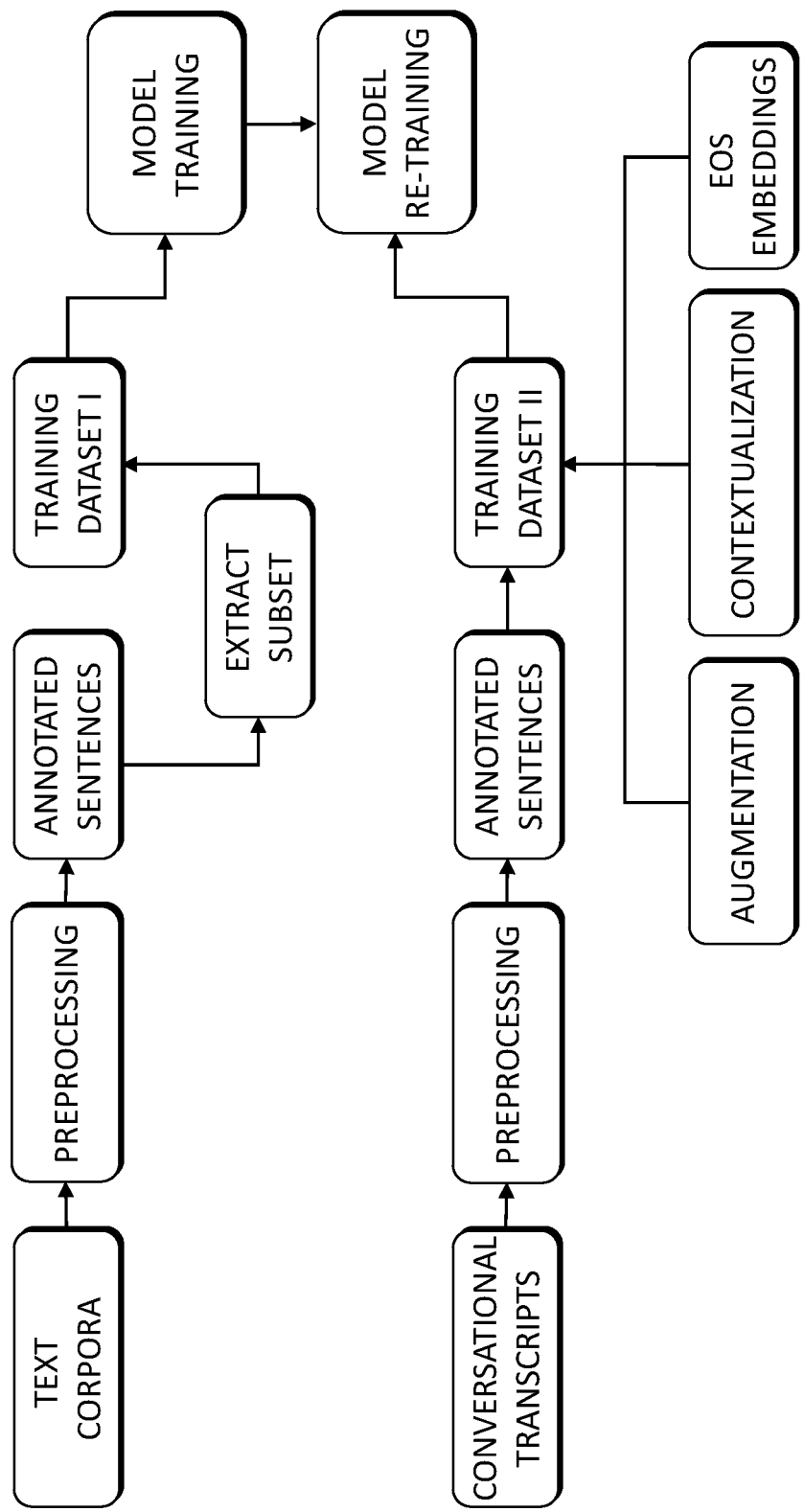
FIG. 2B is a schematic illustration of data processing steps in conjunction with constructing one or more machine learning training datasets of the present disclosure, according to some embodiments.

FIG. 2A is a flowchart of the functional steps is a process of the present disclosure for training for generating a machine learning model for automated prediction of punctuation and capitalization in transcribed text; according to some embodiments;

FIG. 2B is a schematic illustration of data processing steps in conjunction with constructing one or more machine learning training datasets of the present disclosure, according to some embodiments.

In some embodiments, at step 200, a first training dataset of the present disclosure may be generated using provided corpora of generic text, e.g., from available proprietary and/or public sources. In some embodiments, the provided text is punctuated and capitalized text. In some embodiments, the provided text is annotated with corresponding punctuation and capitalization annotations, wherein the annotating may be performed manually, by annotation specialists.

In some embodiments, the provided corpora undergoes selection and/or filtering to extract a subset of the text, e.g., by filtering based on language and/or other criteria. In some embodiments, this step removes noise and irrelevant material which helps to make the training faster and less prone to negative effects of noise.

In some embodiments, the present disclosure uses a language modeling approach using a speech recognition language model, to select a relevant subset from the provided corpora, wherein the model predicts a probability that an input sentence is the result of a speech recognition process applied to domain-specific (e.g., call center) speech. In some embodiments, the present disclosure may use a word count model, where for each sentence in the provided corpora, the model counts how many of the words in the sentence match entries in a known dictionary (e.g., a domain-specific distortionary comprising typical call center vocabulary), and may select only those sentences comprising in-vocabulary words above a specified threshold (e.g., 80%).

In some embodiments, at step 202, the provided text corpora may be preprocessed, e.g., to normalize and/or standardize text in the corpora. For example, preprocessing may be applied to transform all words into lowercase, and/or tag each word with corresponding punctuation and capitalization tags. For example, in some embodiments, the sentence, "Hi, how can I help you?" may be transformed as follows:

| Word | hi | how | can | i | help | you |
|---|---|---|---|---|---|---|
| Punctuation output | Comma | O | O | O | O | Qu_mark |
| Capitalization output | C | O | O | C | O | O |

In some embodiments, a preprocessing stage of the present disclosure may generate a corpus of sentences, wherein all entities (words) in the corpus are uniformly presented (e.g., in lowercase).

In some embodiments, at step 204, the first training dataset may be used to perform a preliminary training of a machine learning model of the present disclosure. In some embodiments, a preliminarily trained machine learning model of the present disclosure, e.g., trained on the first training dataset, may be configured to predict punctuation and capitalization in transcribed text, e.g., text from publicly available corpora.

In some embodiments, at step 206, a second training dataset of the present disclosure may be constructed using a domain-specific text corpus comprising conversational speech, e.g., using call center conversations transcripts. In some embodiments, the conversational speech corpus may comprise multi-turn dialog, e.g., conversations between two or more participants which feature a back-and-forth dialog, e.g., between a customer and an agent.

In some embodiments, the domain-specific conversational speech corpus may be obtained from recorded conversations using, e.g., manual transcribing of recoded voice conversations. In some embodiments, the domain-specific conversational speech corpus may be obtained from recorded conversations using, e.g., Automatic Speech Recognition (ASR) to recognize recoded voice conversations.

In some embodiments, the domain-specific conversational speech corpus may be punctuated and capitalized, e.g., manually. In some embodiments, the domain-specific conversational speech corpus may be annotated with corresponding punctuation and capitalization annotations, wherein the annotating may be performed manually, by annotation specialists.

In some embodiments, the domain specific conversational speech corpus may comprise one or more of the following:
  The speech may come from multi-modal sources, e.g., voice conversations, typed chats, text messaging, email conversation, etc.
  the speech may comprise interactions between at least two sides, e.g., an agent and a customer.
  the speech may reflect conversations of varying lengths, and/or snippets and portions of conversations.

In some embodiments, the conversational speech corpus the provided text is annotated with corresponding punctuation and capitalization annotations, wherein the annotating may be performed manually, by annotation specialists.

In some embodiments, at step 208, the conversational speech corpus may be preprocessed in a similar way to the generic text in the first training dataset (see above), e.g., by normalizing and/or standardizing the text. For example, preprocessing may be applied to transform all words into lowercase, and/or tag each word with corresponding punctuation and capitalization tags.

In some embodiments, at step 210, contextualization and/or data augmentation may be used to enhance the training data obtained from the conversational speech corpus.

In some embodiments, the conversational speech corpus may be contextualized, e.g., in recognition of the fact that punctuation may be context-dependent. For example, as a stand-alone sequence, it is impossible to know if the utterance, "Takes a month to get there" is a question or a statement. However, when considering its context (e.g., preceding and/or succeeding utterances), its purpose may become clear. Following are examples of conversational speech comprising word sequences whose punctuation may be context-dependent:

Agent: It takes up to four weeks for check or money order to come in.
Customer: Takes a month to get there? ← Context only Question mark
  Customer: They say in Atlanta there is a hundred and two streets that have Peach Tree in them.
Agent: Really? ← Context only Question mark
  Customer: Yeah.
Agent: Okay, that would be August, the twenty third.
Customer: August twenty third? ← Context only Question mark
  Agent: Yes.
Agent: And the only thing is, parking might be a bit of a problem.
Customer: Car park? ← Context only Question mark
  Agent: Yes.

Accordingly, in some embodiments, the present disclosure provides for contextualizing domain-specific conversational speech by, e.g., generating conversational training segments comprising multiple sentences each. In some embodiments, such conversational speech segments may be created, e.g., by segmenting the conversational speech corpus according to one or more rules. For example, when a conversation comprises 12 sentences $[S_1, S_2, \ldots, S_12]$, a segmentation rule may provide for segmenting the conversation into 4-sentence segments, such that the training segments may become:

$E_1=[S_1,S_2,S_3,S_4]$ $E_2=[S_5,S_6,S_7,S_8]$ $E_3=[S_9,S_{10},S_{10},S_{12}]$

In other embodiments, additional and/or other segmentation and/or concatenation rules may be applied, concatenating, e.g., more or fewer sentences into conversational training segments.

However, a potential disadvantage of sentence concatenation and/or segmentation as shown immediately above may be that edge sentences in each conversational training segment, for example sentences $S_5$ in segment $E_2$ and $S_9$ in segment $E_3$, cannot be properly contextualized using preceding text data, whereas $S_4$ in segment $E_1$ and $S_8$ in segment $E_2$, e.g., cannot be properly contextualized using succeeding text data. ($S_1$ can never have context before, of course).

Accordingly, in some embodiments, at step 210, the present disclosure provides for data augmentation, wherein a data augmentation mechanism is configured for expanding each sentence in both directions, e.g., using preceding and succeeding dialog form the conversation. For example, a data augmentation algorithm of the present disclosure may be configured to iteratively add preceding and/or succeeding sentences to a given first sentence, until the result meets specified criteria of permissibility, e.g., word count and/or speaker count minimums.

In some embodiments, a data augmentation algorithm of the present disclosure may comprise the following:

```
For sentence S_i = S_1 ... S_N in dialog:
    Queue = S_i
    example = [ ]
    While Queue is not Empty:
        new_sentence = dequeue (Queue)
        example = add_sentence(example, new_sentence)
    if is_permissible_augmented_example(example):
        add_to_corpus(example)
        break
    else:
        #If this segment is not permissible, add sentences i − 1 and i + 1
        Queue.enqueue(S_{i−1}, S_{i+1})
```

In some embodiments, the add_sentence logic is a simple logic that adds a new sentence either as a prefix or as a suffix of an example sentence, according to the sentence index in the conversation.

A permissible example would be an example that follows some specified rule(s), e.g., meeting word count and/or speaker count minimums. For example, a permissible example may be required to have least two speakers and at least 25 words:

```
is_permissible_augmented_example(example):
    if speaker_count < min_speakers:
        return False
    if word_count < min_words:
        return False
    return True
```

Using this algorithm, the same conversation with 12 sentences, $C=[S_1, S_2, \ldots, S_{12}]$, Can now be segmented as:

$E_1=[S_1,S_2,S_3,S_4]$ $E_2=[S_3,S_4,S_5,S_6]$ $E_3=[S_6,S_7,S_8,S_9,S_10,S_11]$, $E_4=[S_10,S_11,S_12]$ where the overlap between segments and the length of each segment is dynamic and determined by the algorithm, and each sentence in the conversation can, and usually is, used in more than one context.

In some embodiments, at step 212, the present disclosure provides for end-of-sentence (EOS) embeddings in the training dataset. When looking at training segments comprising a single sentence, representing the input to the neural network is trivial, and can be done using standard 1-hot representation, where every word gets an index in a vector at the size of the vocabulary, and the words are input one by one in a sequence. However, when multiple sentences are included in a training example, there is important information that might get lost, e.g., which is the last word in every sentence. This information is crucial for both punctuation and capitalization, because the last word in a sentence is almost always followed by a period or question mark, and the word that follows it is always capitalized.

Accordingly, in some embodiments, the present disclosure provides for embedding EOS data in training examples comprising multiple concatenated sentences. In some embodiments, EOS embedding may comprise an indication as to whether a word is "in" a sentence, or at the "end" of a sentence. For example, the short dialog presented above Agent: It takes up to four weeks for check or money order to come in.
Customer: Takes a month to get there would become, as a single training example for the neural network:

| Word | it | takes | up | to | four | weeks | for | check | or | money | order |
|---|---|---|---|---|---|---|---|---|---|---|---|
| Position | In | In | In | In | In | In | In | In | In | In | In |
| Word | to | come | in | takes | a | month | to | get | there | | |
| Position | In | In | End | In | In | In | In | In | End | | |

The additional EOS input would help the machine learning model to predict a punctuation symbol after the words "in" and "there," and help the model capitalize the word "takes."

Figure 3:
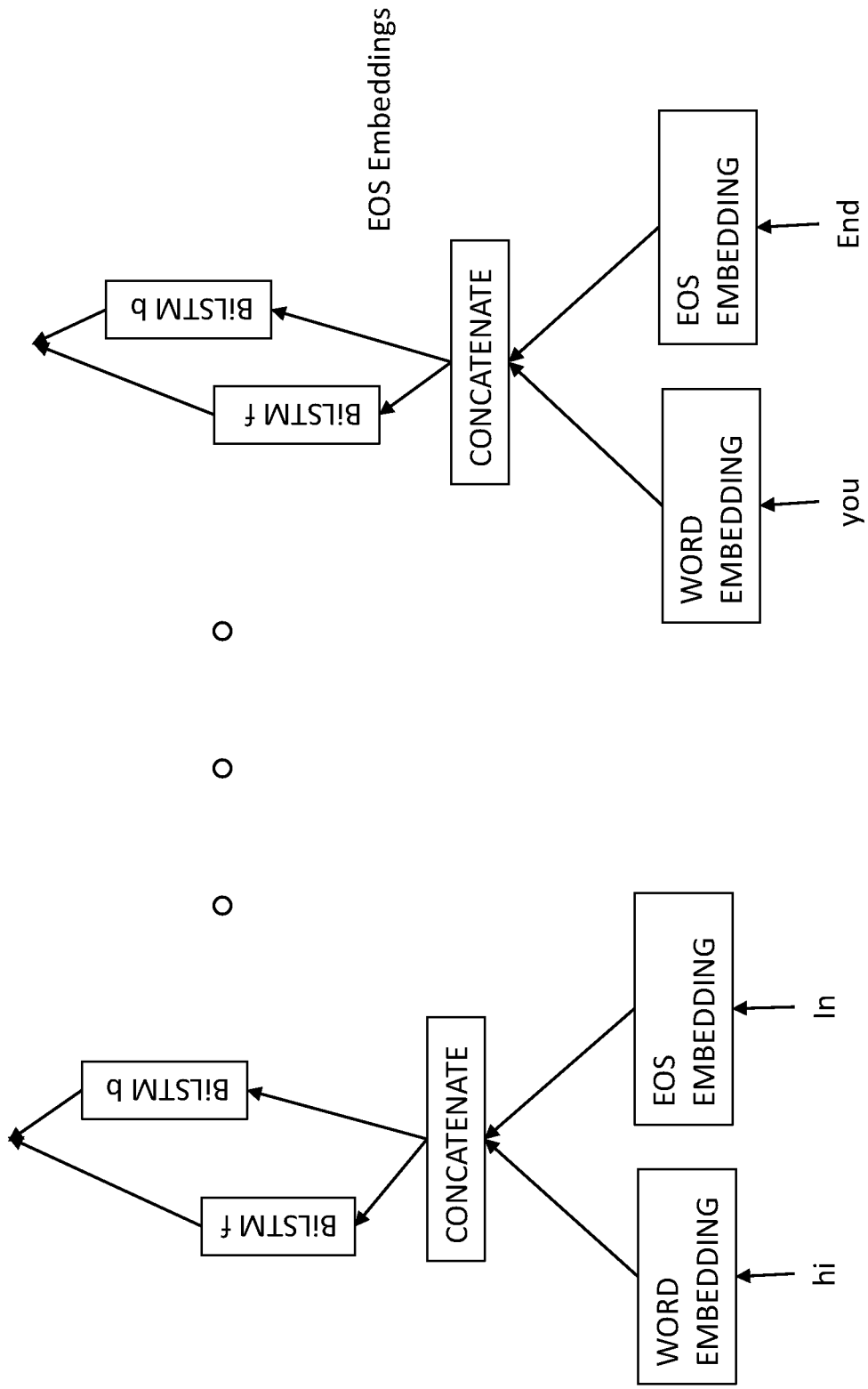
FIG. 3 is a schematic illustration of a neural network structure comprising end-of-sentence embedding, which may be employed in the context of a machine learning model of the present disclosure, according to some embodiments.

FIG. 3 is a schematic illustration of a neural network structure which may be employed in the context of a machine learning model of the present disclosure. As can be seen, the addition of the EOS embedding gives this feature a significant weight relative to the word embeddings. In some embodiments, an embedding of the EOS feature may represent, e.g., an embedding size of 30, which is 10% of the embedding size of the word embedding. The present inventors have found that using data augmentation in conjunction with EOS embeddings provides for an improvement of approximately 10% in the classification of question marks and commas, which are the toughest ones to accurately predict.

In some embodiments, at step 214, the second training dataset may be used for re-training the machine learning model of the present disclosure.

In some embodiments, at step 216, a trained machine learning model of the present disclosure may be applied to target data comprising, e.g., recognized conversational speech, to predict punctuation and capitalization of words comprised in the speech.

In some embodiments, a machine learning model of the present disclosure may employ a neural network structure configured for multi-task/multi-objective classification and prediction.

By way of background, classification tasks are typically handled one at a time. Thus, to perform a punctuation and capitalization task, it is typically required to train two sequence tagging machine learning models.

Conversely, the present disclosure employs multitask learning to generate a single machine learning model trained to perform more than one task simultaneously. Besides the obvious gain of having to train (an offline process) and inference (an online process in production) only one model, a single model also has a potential information gain: The capitalization information that trains a capitalization network could in theory contribute to the punctuation training, due to the strong dependency between the tasks; a capitalized word often comes after a period. Similarly, punctuation information like question mark and period trains the network that the next word is capitalized.

Figure 4:
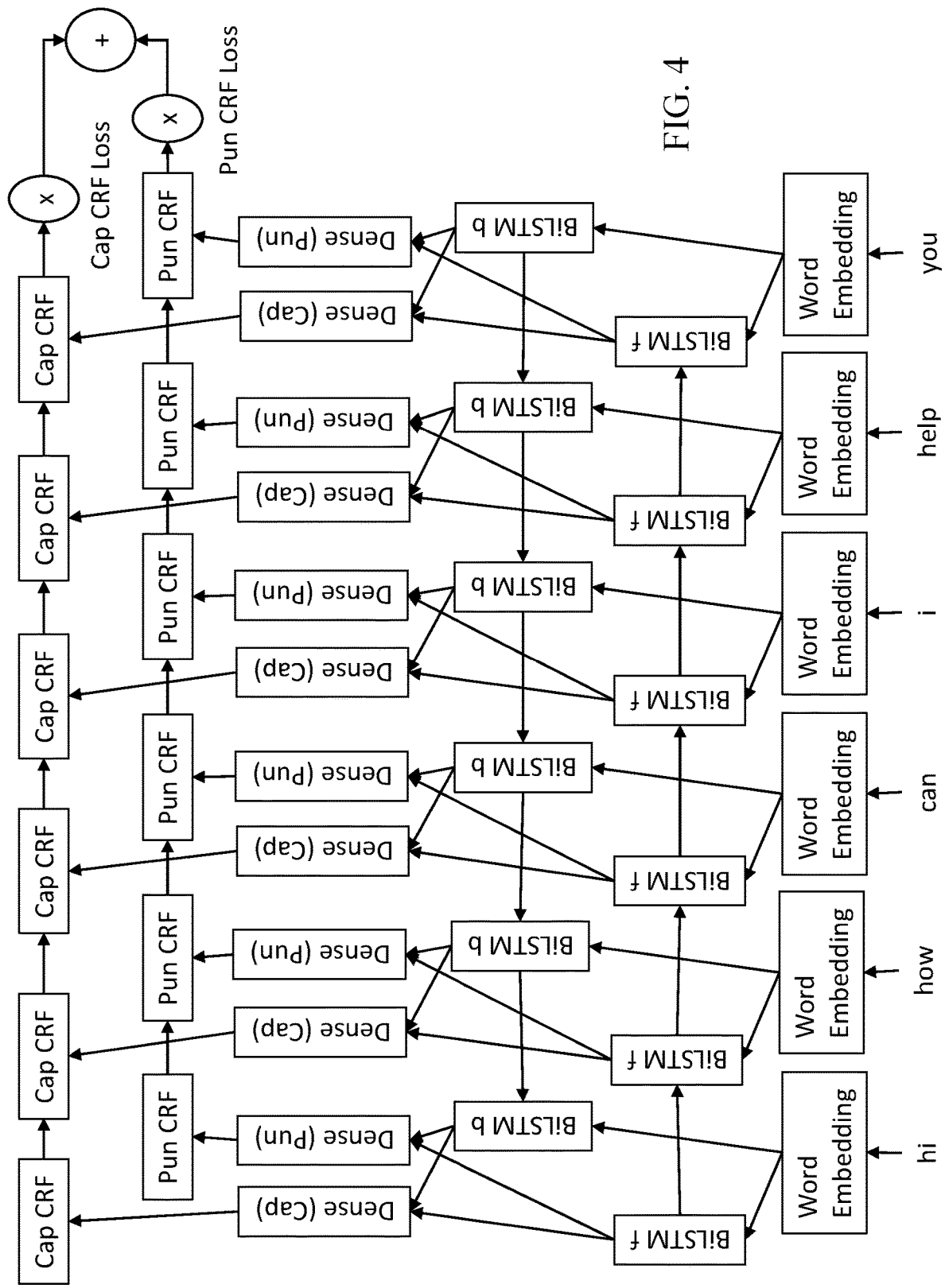
FIG. 4 is a schematic illustration of a neural network structure for predicting punctuation and capitalization jointly, according to some embodiments.

Accordingly, in some embodiments, the present disclosure employs a network architecture as schematically illustrated in FIG. 4. In some embodiments, the exemplary neural network structure depicted in FIG. 4 enables a machine learning model of the present disclosure to learn punctuation and capitalization jointly.

In some embodiments, the present disclosure provides for a one or more neural network-based machine learning models trained to perform a sequence tagging task. In some embodiments, these models may include one or more Long Short-Term Memory (LSTM) networks, bidirectional LSTM networks (BiLSTM), LSTM networks with a CRF layer (LSTM-CRF), and/or bidirectional LSTM networks with a Conditional Random Field (CRF) layer (BILSTM-CRF).

As can be seen in FIG. 4, an exemplary neural network of the present disclosure may comprise, e.g., one or more of a bidirectional LSTM networks (BiLSTM) layer, a dense layer, and/or a Conditional Random Field (CRF) layer. In some embodiments, the present disclosure may provide for an exemplary neural network comprising two joint networks for learning capitalization and punctuation, wherein each of the networks comprises, e.g., one or more of a BiLSTM layer, a dense layer, and a CRF layer. In some embodiments, BiLSTM layers enable the hidden states to capture both historical and future context information and then to label a token. In some embodiments, CRF layers provide for considering the correlations between a current label and neighboring labels, which imposes a conditional probability constraint on the results.

In some embodiments, the exemplary neural network architecture presented in FIG. 4 provides for minimizing two loss functions, one for each of the joint networks, e.g., a capitalization loss function and a punctuation loss function. In some embodiments, the present network then calculates a weighted sum of the punctuation loss and capitalization loss, which represents a combined loss of the joint prediction. In some embodiments, the weighted sum of the separate loss functions may reflect a ratio of ⅔ for the punctuation loss and ⅓ for the capitalization loss, which corresponds to the relative number of classes in each task (4 and 2, respectively). Using these weights in multitask training, an overall improvement may be obtained over using separate models, in addition to any reduction in computational overhead and complexity, both in training and in prediction in production.

In some embodiments, the present disclosure provides for joint training of the machine learning model comprising a network architecture defining two joint networks for learning capitalization and punctuation. In some embodiments, every training segment used for training the machine learning model of the present disclosure may comprise two different sets of tags: tags for punctuation and tags for capitalization (in addition to the actual input word and optionally EOS embedding):

| Word | hi | how | can | i | help | you |
|---|---|---|---|---|---|---|
| Position | In | In | In | In | In | End |
| Punctuation output | Comma | O | O | O | O | Qu_mark |
| Capitalization output | C | O | O | O | O | O |

In some embodiments, at inference stage 216 in FIG. 2, data augmentation may create overlap among inferenced target speech segments, wherein some of the sentences appear in multiple target segments input for inference and prediction purposes.

For example, a conversation comprising four turns (or sentences) $[T_1, T_2, T_3, T_4]$ may be used to generate two examples for inference $[T_1, T_2, T_3]$, $[T_2, T_3, T_4]$. In that case, all the words in, e.g., $T_3$, may be used twice, once in the context $[T_1, T_2, T_3]$ and a second time in the context $[T_2, T_3, T_4]$. Upon inferencing with the trained machine learning model on the target segments, the output may include conflicting predictions with respect to, e.g., punctuation and/or capitalization of one or more words. In some embodiments, the trained machine learning model of the present disclosure may be configured to assign a confidence score for each of the classification classes, wherein the scores for all classes sum to 1.0. Thus, each word in the example $[T_1, T_2, T_3]$ will get a score for every possible tag (class), and each word in the example $[T_2, T_3, T_4]$ will get a score for every possible tag (class).

So, assuming that $T_3$ contains 5 words $[w_1, w_2, w_3, w_4, w_5]$, inferencing $T_3$ in target segment context $[T_1, T_2, T_3]$ may produce the following results with respect to word $w_1$ (wherein Φ denotes "irrelevant" with respect to the other words in $T_3$ for purposes of this example):

|       | $w_1^{T3}$ | $w_2^{T3}$ | $w_3^{T3}$ | $w_4^{T3}$ | $w_5^{T3}$ |
|-------|------|---|---|---|---|
| Comma | 0.7 | Φ | Φ | Φ | Φ |
| Other | 0.1 | Φ | Φ | Φ | Φ |
| Period | 0.1 | Φ | Φ | Φ | Φ |
| Question Mark | 0.1 | Φ | Φ | Φ | Φ |

Similarly, inferencing $T_3$ in the target segment context $[T_2, T_3, T_4]$ may produce the following results with respect to word $w_1$ (wherein Φ denotes "irrelevant" with respect to the other words in $T_3$ for purposes of this example):

|       | $w_1^{T3}$ | $w_2^{T3}$ | $w_3^{T3}$ | $w_4^{T3}$ | $w_5^{T3}$ |
|-------|------|---|---|---|---|
| Comma | 0 | Φ | Φ | Φ | Φ |
| Other | 0.9 | Φ | Φ | Φ | Φ |
| Period | 0.05 | Φ | Φ | Φ | Φ |
| Question Mark | 0.05 | Φ | Φ | Φ | Φ |

Accordingly, in some embodiments, the present disclosure provides for a conflicting tagging resolution mechanism which takes all the predictions of every word in each target segment context into account. For each word, the conflict resolution mechanism averages all the prediction scores it receives from all the contexts in which it exists, and eventually select the maximal average score.

Thus, $w_1$ in $T_3$ scores average:

|       | $w_1^{T3}$ | $w_2^{T3}$ | $w_3^{T3}$ | $w_4^{T3}$ | $w_5^{T3}$ |
|-------|------|---|---|---|---|
| Comma | 0.35 | Φ | Φ | Φ | Φ |
| Other | 0.5 | Φ | Φ | Φ | Φ |
| Period | 0.075 | Φ | Φ | Φ | Φ |
| Question Mark | 0.075 | Φ | Φ | Φ | Φ |

Accordingly, the machine learning model output will tag $w_1$ with the punctuation tag "other," which received the highest confidence score of the possible classes.

Some aspects of embodiments of the present invention may also be associated with associating the answers to multiple choice questions with particular topics. For example, in a manner similar to comparing the text of the question to the various topics, the answers of a multiple choice question can be compared, in conjunction with the question text, to the topics in order to identify which topics distinguish those answers from the other answers. In other words, because both the question and the answer correlate in the interaction document, each answer is unified with the question to form a separate question and answer combination, and the resulting combination is compared to the topics to identify a most similar topic.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Experiments conducted and described above demonstrate the usability and efficacy of embodiments of the invention. Some embodiments of the invention may be configured based on certain experimental methods and/or experimental results; therefore, the following experimental methods and/or experimental results are to be regarded as embodiments of the present invention.

What is claimed is:

1. A system comprising:
   at least one hardware processor; and
   a non-transitory computer-readable storage medium having stored thereon program instructions, the program instructions executable by the at least one hardware processor to:
   receive a first text corpus comprising punctuated and capitalized text,
   annotate words in said first text corpus with a set of labels, wherein said labels indicate a punctuation and a capitalization associated with each of said words in said first text corpus,
   at an initial training stage, train a machine learning model on a first training set comprising:
   (i) said annotated words in said first text corpus, and
   (ii) said labels,
   receive a second text corpus representing conversational speech,
   annotate words in said second text corpus with said set of labels, wherein said labels indicate a punctuation and a capitalization associated with each of said words in said second text corpus,
   at a re-training stage, re-train said machine learning model on a second training set comprising:
   (iii) said annotated words in said second text corpus, and
   (iv) said labels, and
   at an inference stage, apply said trained machine learning model to a target set of words representing conversational speech, to predict a punctuation and capitalization of each word in said target set,
   wherein the predicting further comprises a confidence score associated with each of said predicted punctuation and predicted capitalization, and
   wherein, when a word in said target set is included in two or more of said segments and receives two or more of said predictions with respect to said punctuation or capitalization, said confidence scores associated with said two or more predictions are averaged to produce a final confidence score of said predicting.

2. The system of claim 1, wherein said labels indicating punctuation are selected form the groups consisting of: comma, period, question mark, and other, and wherein said labels indicating capitalization are selected from the group consisting of: capitalized and other.

3. The system of claim 1, wherein said first text corpus is preprocessed, before said training, by at least transforming all words in said first text corpus into lowercase.

4. The system of claim 1, wherein said second text corpus is preprocessed, before said re-training, by performing contextualization, and wherein said contextualization comprises segmenting said text corpus into segments, each comprising at least two sentences.

5. The system of claim 1, wherein said second text corpus is preprocessed, before said re-training, by performing data augmentation, and wherein said data augmentation comprises extending at least some of said segments by adding at least one of: one or more preceding sentences in said conversational speech, and one or more succeeding sentences in said conversational speech.

6. The system of claim 1, wherein said second text corpus is preprocessed, before said re-training, by including end-of-sentence (EOS) embeddings.

7. The system of claim 1, wherein said second text corpus and said target set of words each comprises transcribed text representing a conversation between at least two participants, and wherein said at least two participants are an agent at a call center and a customer.

8. The system of claim 7, wherein said transcribing comprises at least one analysis selected from the group consisting of: textual detection, speech recognition, and speech-to-text detection.

9. A method comprising:
receiving a first text corpus comprising punctuated and capitalized text;
annotating words in said first text corpus with a set of labels, wherein said labels indicate a punctuation and a capitalization associated with each of said words in said first text corpus;
at an initial training stage, training a machine learning model on a first training set comprising:
(i) said annotated words in said first text corpus, and
(ii) said labels;
receiving a second text corpus representing conversational speech;
annotating words in said second text corpus with said set of labels, wherein said labels indicate a punctuation and a capitalization associated with each of said words in said second text corpus;
at a re-training stage, re-training said machine learning model on a second training set comprising:
(iii) said annotated words in said second text corpus, and
(iv) said labels; and
at an inference stage, applying said trained machine learning model to a target set of words representing conversational speech, to predict a punctuation and capitalization of each word in said target set,
wherein the predicting further comprises a confidence score associated with each of said predicted punctuation and predicted capitalization, and
wherein, when a word in said target set is included in two or more of said segments and receives two or more of said predictions with respect to said punctuation or capitalization, said confidence scores associated with said two or more predictions are averaged to produce a final confidence score of said predicting.

10. The method of claim 9, wherein said labels indicating punctuation are selected form the groups consisting of: comma, period, question mark, and other, and wherein said labels indicating capitalization are selected from the group consisting of: capitalized and other.

11. The method of claim 9, wherein said first text corpus is preprocessed, before said training, by at least transforming all words in said first text corpus into lowercase.

12. The method of claim 9, wherein said second text corpus is preprocessed, before said re-training, by performing contextualization, and wherein said contextualization comprises segmenting said text corpus into segments, each comprising at least two sentences.

13. The method of claim 9, wherein said second text corpus is preprocessed, before said re-training, by performing data augmentation, and wherein said data augmentation comprises extending at least some of said segments by adding at least one of: one or more preceding sentences in said conversational speech, and one or more succeeding sentences in said conversational speech.

14. The method of claim 9, wherein said second text corpus is preprocessed, before said re-training, by including end-of-sentence (EOS) embeddings.

15. A computer program product comprising a non-transitory computer-readable storage medium having program instructions embodied therewith, the program instructions executable by at least one hardware processor to:
receive a first text corpus comprising punctuated and capitalized text;
annotate words in said first text corpus with a set of labels, wherein said labels indicate a punctuation and a capitalization associated with each of said words in said first text corpus;
at an initial training stage, train a machine learning model on a first training set comprising:
(i) said annotated words in said first text corpus, and
(ii) said labels;
receive a second text corpus representing conversational speech;
annotate words in said second text corpus with said set of labels, wherein said labels indicate a punctuation and a capitalization associated with each of said words in said second text corpus;
at a re-training stage, re-train said machine learning model on a second training set comprising:
(iii) said annotated words in said second text corpus, and
(iv) said labels; and
at an inference stage, apply said trained machine learning model to a target set of words representing conversational speech, to predict a punctuation and capitalization of each word in said target set,
wherein the predicting further comprises a confidence score associated with each of said predicted punctuation and predicted capitalization, and
wherein, when a word in said target set is included in two or more of said segments and receives two or more of said predictions with respect to said punctuation or capitalization, said confidence scores associated with said two or more predictions are averaged to produce a final confidence score of said predicting.

16. The computer program product of claim 15, wherein said first text corpus is preprocessed, before said training, by at least transforming all words in said first text corpus into lowercase.

17. The computer program product of claim 15, wherein said labels indicating punctuation are selected form the groups consisting of: comma, period, question mark, and other, and wherein said labels indicating capitalization are selected from the group consisting of: capitalized and other.

18. The computer program product of claim 15, wherein said second text corpus is preprocessed, before said re-training, by performing at least one of: contextualization comprising segmenting said text corpus into segments, each comprising at least two sentences; data augmentation comprising extending at least some of said segments by adding at least one of: one or more preceding sentences in said conversational speech, and one or more succeeding sentences in said conversational speech; and including end-of-sentence (EOS) embeddings.

19. A system comprising:
at least one hardware processor; and a non-transitory computer-readable storage medium having stored thereon program instructions, the program instructions executable by the at least one hardware processor to perform operations of a multi-task neural network, the multi-task neural network comprising:
  a capitalization prediction network that receives as input a text corpus comprising at least one sentence, and predicts a capitalization of each word in said at least one sentence, wherein the capitalization prediction network is trained based on a first loss function,
  a punctuation prediction network that receives as input said text corpus, and predicts a punctuation with respect to said text corpus, wherein the punctuation prediction network is trained based on a second loss function,
  an output layer which outputs a joint prediction of said capitalization and said punctuation, based on a multi-task loss function that combines said first and second loss functions, wherein said capitalization prediction network and said punctuation prediction network are jointly trained, and
  wherein said program instructions are further executable to apply, at an inference stage, said multi-task neural network to a target set of words representing conversational speech, to predict a punctuation and capitalization of each word in said target set,
    wherein the predicting further comprises a confidence score associated with each of said predicted punctuation and predicted capitalization, and
    wherein, when a word in said target set is included in two or more of said segments and receives two or more of said predictions with respect to said punctuation or capitalization, said confidence scores associated with said two or more predictions are averaged to produce a final confidence score of said predicting.

20. The system of claim 19, wherein said joint training comprises training said capitalization prediction network and said punctuation prediction network jointly, at an initial training stage, on a first training set comprising:
  (i) a first text corpus comprising punctuated and capitalized text; and
  (ii) labels indicating a punctuation and a capitalization associated with each of said words in said first text corpus.

21. The system of claim 20, wherein said joint training further comprises training said capitalization prediction network and said punctuation prediction network jointly, at a re-training stage, on a second training set comprising:
  (iii) a second text corpus representing conversational speech; and
  (iv) labels indicating a punctuation and a capitalization associated with each of said words in said second text corpus.

22. The system of claim 21, wherein said labels indicating punctuation are selected form the groups consisting of: comma, period, question mark, and other, and wherein said labels indicating capitalization are selected from the group consisting of: capitalized and other.

23. The system of claim 21, wherein said first text corpus is preprocessed, before said training, by at least transforming all words in said first text corpus into lowercase.

24. The system of claim 21, wherein said second text corpus is preprocessed, before said re-training, by performing contextualization, and wherein said contextualization comprises segmenting said text corpus into segments, each comprising at least two sentences.

25. The system of claim 21, wherein said second text corpus is preprocessed, before said re-training, by performing data augmentation, and wherein said data augmentation comprises extending at least some of said segments by adding at least one of: one or more preceding sentences in said conversational speech, and one or more succeeding sentences in said conversational speech.

26. The system of claim 21, wherein said second text corpus is preprocessed, before said re-training, by including end-of-sentence (EOS) embeddings.

* * * * *